(12) United States Patent
Kanayama et al.

(10) Patent No.: US 10,400,974 B2
(45) Date of Patent: Sep. 3, 2019

(54) ILLUMINATION DEVICE HAVING A PLURALITY OF LIGHT GUIDES, HEADLIGHT INCLUDING THE ILLUMINATING DEVICE, AND MOVABLE BODY INCLUDING THE HEADLIGHT

(71) Applicant: PANASONIC INTELLECTUAL PROPERTY MANAGEMENT CO., LTD., Osaka (JP)

(72) Inventors: Yoshihiko Kanayama, Hyogo (JP); Yasuharu Ueno, Osaka (JP); Hiroya Tsuji, Kyoto (JP); Tomoyuki Ogata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/902,586

(22) Filed: Feb. 22, 2018

(65) Prior Publication Data

US 2018/0245760 A1    Aug. 30, 2018

(30) Foreign Application Priority Data

Feb. 27, 2017 (JP) .................................. 2017-035257

(51) Int. Cl.
| | |
|---|---|
| *F21S 41/24* | (2018.01) |
| *F21S 41/25* | (2018.01) |
| *F21S 41/153* | (2018.01) |
| *F21S 41/143* | (2018.01) |
| *F21S 41/29* | (2018.01) |

(Continued)

(52) U.S. Cl.
CPC ............. *F21S 41/24* (2018.01); *F21S 41/143* (2018.01); *F21S 41/153* (2018.01); *F21S 41/25* (2018.01); *F21S 41/255* (2018.01); *F21S 41/29* (2018.01); *F21S 41/663* (2018.01); *B60Q 1/04* (2013.01)

(58) Field of Classification Search
CPC . G02B 6/0075; G02B 6/0073; F21Y 2105/10; F21S 41/24
See application file for complete search history.

(56) References Cited

U.S. PATENT DOCUMENTS

| | | | | |
|---|---|---|---|---|
| 9,851,065 | B2* | 12/2017 | Taudt ................. | G02B 19/0028 |
| 9,879,835 | B2* | 1/2018 | Taudt ...................... | F21S 41/24 |
| 2015/0377453 | A1* | 12/2015 | Ji ............................ | F21S 41/24 |
| | | | | 362/607 |

FOREIGN PATENT DOCUMENTS

JP    2009-224191 A    10/2009

OTHER PUBLICATIONS

U.S. Appl. No. 15/903,639 to Tsuji et al., filed Feb. 23, 2018.

* cited by examiner

*Primary Examiner* — Robert J May
(74) *Attorney, Agent, or Firm* — Greenblum & Bernstein, P.L.C.

(57) ABSTRACT

An illumination device, a headlight, and a movable body are provided which can increase luminosity and resolution at a central region or a peripheral region in an illuminable region. A primary lens is placed at a light emission side of a plurality of light sources, and the primary lens includes a plurality of light guides corresponding in a one-to-one relationship to the plurality of light sources. A size of a light exit surface of a light guide corresponding to a light source which illuminates a central region in the illuminable region of the headlight is set to differ from a size of a light exit surface of a light guide corresponding to a light source which illuminates a peripheral region surrounding the central region.

11 Claims, 6 Drawing Sheets

(51) Int. Cl.
*F21S 41/255* (2018.01)
*F21S 41/663* (2018.01)
*B60Q 1/04* (2006.01)

ILLUMINATION DEVICE HAVING A PLURALITY OF LIGHT GUIDES, HEADLIGHT INCLUDING THE ILLUMINATING DEVICE, AND MOVABLE BODY INCLUDING THE HEADLIGHT

CROSS REFERENCE TO RELATED APPLICATION

The entire disclosure of Japanese Patent Application No. 2017-035257 filed on Feb. 27, 2017, including the specification, claims, drawings, and abstract, is incorporated herein by reference in its entirety.

TECHNICAL FIELD

The present disclosure relates to an illumination device, a headlight, and a movable body.

BACKGROUND

In the related art, as an illumination device, there is known a headlight of a vehicle as described in JP 2009-224191 A. In this headlight, a plurality of light emitting elements are mounted on one substrate. In the headlight, brightness of light emitting elements mounted in a first region of the substrate are controlled independently from those of light emitting elements mounted in a second region of the substrate. In this manner, a light distribution control is enabled which is more flexible than a binary light distribution control which includes a light distribution pattern for low beam and a light distribution pattern for high beam.

When light from the light source substrate comprising a plurality of light sources as described in JP 2009-224191 A is to be projected through a projector lens, luminosity insufficiency tends to occur in a central region in which a farther region in an illuminable region is illuminated, and a resolution in the central region also tends to be insufficient. On the other hand, there also are cases where it is desired to increase the luminosity in a peripheral region which is positioned at a periphery of the illuminable region and to increase the resolution in the peripheral region.

An advantage of the present disclosure lies in provision of an illumination device, a headlight, and a movable body in which luminosity can be increased in the central region or in the peripheral region within the illuminable region and the resolution can be increased in the central region or the peripheral region.

SUMMARY

According to one aspect of the present disclosure, there is provided an illumination device comprising: a substrate on which a plurality of light sources are mounted; and a light guide provided at a light emission side of the plurality of light sources, wherein the light guide includes a plurality of light guides corresponding to the plurality of light sources, each of the plurality of light guides includes a light incidence surface provided at the light emission side of the light source, and a light exit surface provided at an opposite end of the light guide, and guides light from a corresponding light source, and a size of a central region of the light exit surface of the light guide differs from a size of a peripheral region of the light exit surface of the light guide.

Advantageous Effects of Invention

According to the illumination device, the headlight, and the movable body of the present disclosure, luminosity in a central region or a peripheral region of an illuminable region can be increased, and a resolution in the central region or the peripheral region can be increased.

BRIEF DESCRIPTION OF DRAWINGS

Embodiment(s) of the present disclosure will be described by reference to the following figures, wherein.

DESCRIPTION OF EMBODIMENTS

An embodiment of the present disclosure will now be described with reference to the accompanying diagrams. In the following description, when a plurality of embodiments and a plurality of alternative configurations are included, a new embodiment suitably combining the characteristic portions of these is also conceived of. Further, in the following, luminosity refers to a total amount of energy of light irradiated per unit time, and represents a luminosity energy. The luminosity is also an amount of the energy of light (light flux) irradiated from the light source integrated over time, and is represented in units of lumens·sec [lm·s]. Moreover, in the following, when a size of a light exit surface of a light guide is referred to, the size refers to a size in a plan view of the light exit surface of the light guide.

Figure 1:
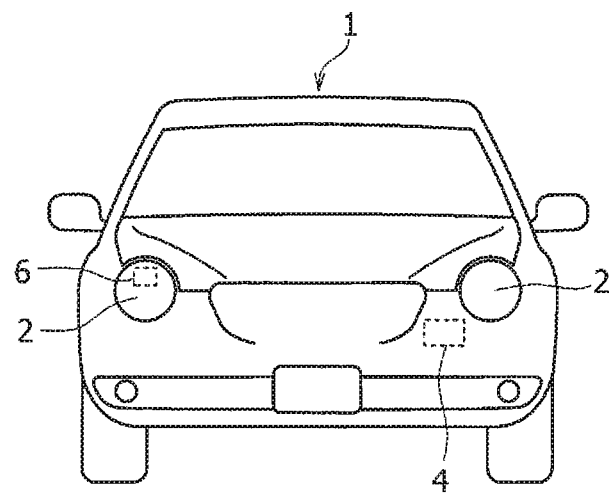
FIG. 1 is a plan view viewing, from a front side, an automobile according to an embodiment of the present disclosure.

FIG. 1 is a plan view when an automobile 1 related to an embodiment of the present disclosure is viewed from a front side. As shown in FIG. 1, the automobile 1 comprises a headlight 2, a battery 4, and a controller 6. The headlight 2 is placed on respective sides in a width direction at front ends of the automobile 1. The battery 4 is equipped in an engine compartment. The controller 6 may be placed in a casing of the headlight 2, or outside of the casing of the headlight 2. When the controller 6 is placed outside of the casing of the headlight 2, the controller 6 may be formed as a part of a controller that comprehensively controls the automobile 1. The headlight 2 is electrically connected to the battery 4. As will be described in detail later with reference to FIG. 4, the headlight 2 includes a drive circuit 30 (refer to FIG. 4). When the controller 6 outputs a signal indicating lighting of the headlight 2 to the drive circuit 30, electric power from the battery 4 is supplied to an LED (light emitting diode) substrate 22 (refer to FIG. 4) serving as a light source substrate, and the headlight 2 is lighted.

Figure 2:
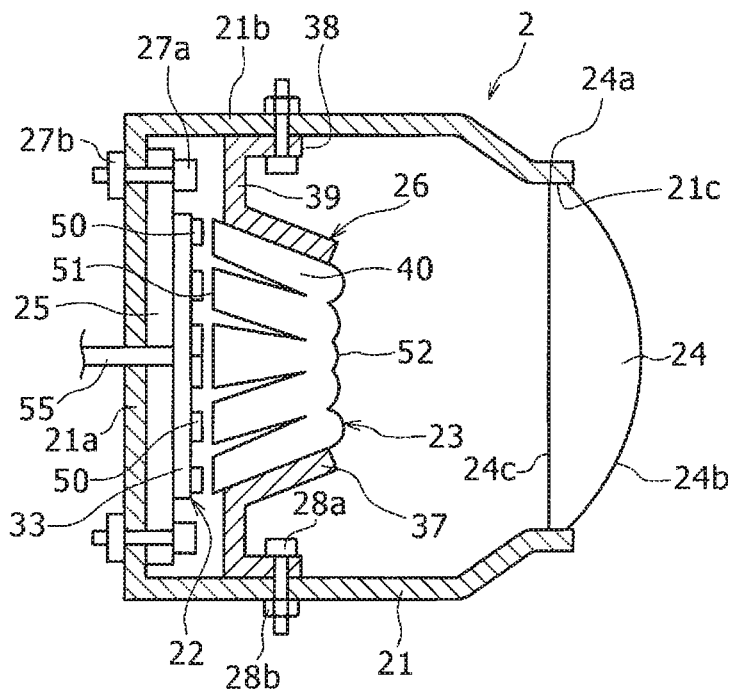
FIG. 2 is a partial cross-sectional diagram of a headlight of the automobile.
Figure 3:
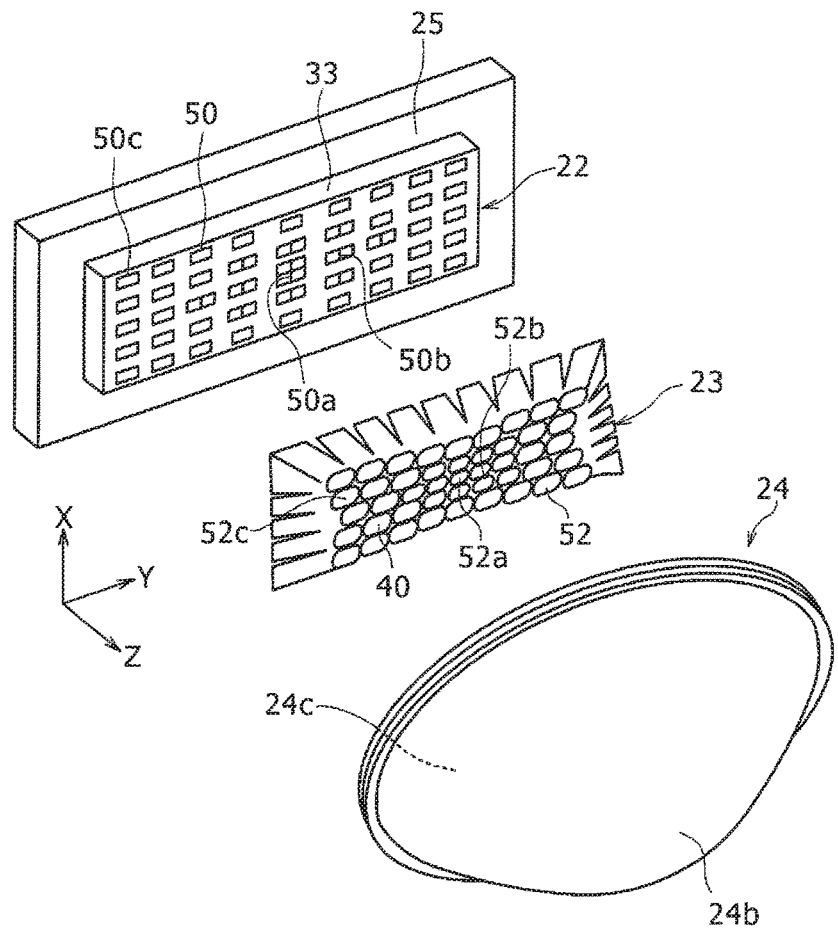
FIG. 3 is an exploded perspective view of a light source substrate, a light guide, and a projector lens, in a state where the headlight is disassembled.

FIG. 2 is a partial cross-sectional diagram of the headlight 2, and FIG. 3 is an exploded perspective diagram of the LED substrate 22, a primary lens 23, and a projector lens 24, in a state where the headlight 2 is disassembled. A structure of the headlight 2 will now be briefly described with reference to FIGS. 2 and 3.

As shown in FIG. 2, the headlight 2 comprises the LED substrate 22, which is an example of a light source substrate, the primary lens 23, serving as a light guide, and the projector lens 24. The LED substrate 22 and the primary lens 23 are placed in a casing 21, and the projector lens 24 is attached to the casing 21. The LED substrate 22 comprises a substrate 33, and a plurality of light sources 50 mounted on a front side (side of the projector lens 24) of the substrate 33, with a spacing between the light sources. The LED substrate 22 is fixed on a substrate attachment plate 25 by a fixation means such as, for example, a fastener member, and adhesive, or the like. The substrate attachment plate 25 is attached, for example, to a flat plate unit 21a forming a bottom of the casing 21 by a fixation means such as, for example a bolt 27a and a nut 27b. Each light source 50 is formed from one or more light emitting diode chips (hereinafter referred to as "LED chips"). The LED chip is an example of a light emitting element. The structure of the light source 50 will be described later. A cable 55 for supplying electric power to the light source 50 is electrically connected to the LED substrate 22. The cable 55 passes, for example, through a through hole formed on the substrate attachment plate 25 and a through hole formed at the bottom of the casing, extends from inside of the casing 21 to the outside of the casing 21, and is electrically connected to the drive circuit 30 (refer to FIG. 4).

The primary lens 23 is placed on a light emission side of the plurality of light sources 50. The primary lens 23 has a plurality of light guides 40, in the same number as the light sources 50, and each light guide 40 includes a light incidence surface 51 placed on the light emission side of the light source 50 and a light exit surface 52 placed at an end opposite from the light incidence surface 51. The plurality of light guides 40 corresponds in a one-to-one relationship to the plurality of light sources 50, and each light guide 40 guides the light from the corresponding light source 50 from the light incidence surface 51 to the light exit surface 52. A periphery portion of an end of each light guide 40 on the light exit surface side is joined with a periphery portion of an end of an adjacent light guide 40 at the light exit surface side. As a result, the plurality of light guides 40 are integrated, and the integral primary lens 23 is formed.

The primary lens 23 is fixed, for example, on a casing side wall 21b by a primary fixation member 26. The primary fixation member 26 comprises, for example, an annular portion 37 which contacts the sides of the primary lens 23 over an entire circumference, to constrain the sides, a plate-shaped attachment portion 38 having an attachment surface corresponding to an inner side surface of the casing side wall 21b, and a connection portion 39 which connects the annular portion 37 and the attachment portion 38. With the attachment portion 38 being attached to the casing side wall 21b by a fixation means such as, for example, a bolt 28a and a nut 28b, the primary lens 23 is fixed on the casing 21.

The projector lens 24 is placed at an opposite side from the side of the light source 50 with respect to the light exit surface 52 of the primary lens 23. A surface of the projector lens 24 on the light exit side is formed from a convex surface 24b, and the surface of the projector lens 24 on the incidence side is formed from a flat surface 24c. The casing 21 has one side in an axial direction (direction of normal of the bottom surface of the bottom) opened, and an edge on the one side has a tubular inner circumferential surface 21c. By an edge 24a of the projector lens 24 being fixed on the tubular inner circumferential surface 21c, the primary lens 23 is attached to the casing 21.

As shown in FIG. 3, the plurality of light sources 50 are mounted in a plurality of columns on a front side of the substrate 33, with each column including two or more light sources 50. More specifically, the plurality of light sources 50 are mounted in a matrix form of 5 rows and 9 columns on the front side of the substrate 33. The plurality of light sources 50 include a first group light source 50a formed from 4 LED chips, a second group light source 50b formed from 2 LED chips, and a single light source 50c formed from only 1 LED chip.

In FIG. 3, an X direction coincides with the column direction, and a Y direction coincides with an orthogonal direction orthogonal to the column direction. A Z direction is a direction orthogonal to both the X direction and the Y direction, and coincides with a thickness direction of the substrate 33. One light source 50 positioned at the center in the X direction and the Y direction is formed from the first group light source 50a. The 4 LED chips of the first group light source 50a are placed in 2 rows and 2 columns in a closely contacted state.

Eight light sources 50 surrounding the first group light source 50a and 2 light sources 50 adjacent in the Y direction to 2 light sources 50 placed at the center row among the 8 light sources 50 are the second group light sources 50b. The 2 LED chips of the second group light source 50b are placed in 1 row and 2 columns in a closely contacted state.

In the plurality of light sources 50, the 34 light sources other than the first and second group light sources 50a and 50b are formed from the single light sources 50c. As a result, the first group light source 50a including LED chips in the largest number is placed at the center in the Y direction, and the number of LED chips included in the group light sources 50a and 50b is stepwise reduced from the center in the Y direction toward the ends. The LED chips included in the plurality of light sources 50 are all of the same type. When the same electric power is supplied to the LED chips of the plurality of light sources 50, light of the same wavelength and the same luminosity is emitted.

The primary lens 23 has light guides 40 in the same number as the number of the light sources 50. The light from each light source 50 is incident on the light incidence surface 51 (refer to FIG. 2) of the light guide 40 corresponding to the light source 50, and is emitted from the light exit surface 52 of the corresponding light guide 40. As shown in FIG. 3, a size (area) of the light exit surface 52 in the plan view; that is, a size (area) of the light exit surface 52 viewed from a direction of normal of the substrate 33, becomes smaller as the size of the corresponding light source 50 becomes larger. The size of the light exit surface 52 becomes smaller as the luminosity energy of the light incident on the light incidence surface 51 of the light guide 40 having the light exit surface 52 becomes larger.

Specifically, the size, in the plan view, of the light exit surface 52a of the light guide 40 corresponding to the first group light source 50a formed from 4 LED chips is the smallest among all of the light exit surfaces 52. The size, in the plan view, of the light exit surface 52b of the light guide 40 corresponding to the second group light source 50b formed from 2 LED chips is small next to the size of the light exit surface 52a in the plan view. The size, in the plan view, of the light exit surface 52c of the light guide 40 corresponding to the single light source 50c is the largest among all of the light exit surfaces 52.

The light emitted from each light source 50 passes through the corresponding light guide 40 and is emitted from the light exit surface 52 of the light guide 40. The light emitted from the light exit surface 52 of each light guide 40 is incident on the flat surface 24c of the projector lens 24. The light incident on the flat surface 24c is emitted to the outside from the convex surface 24b of the projector lens 24.

Alternatively, unlike the example configuration shown in FIG. 3, the LED chips may be placed in N rows and M columns (where N and M are arbitrary natural numbers). Further, at least one light source may include a chip having one or more semiconductor laser elements. The chip including the semiconductor laser element is another example of the light emitting element. Moreover, one or more group light sources may include 3 light emitting elements or 5 or more light emitting elements.

Figure 4:
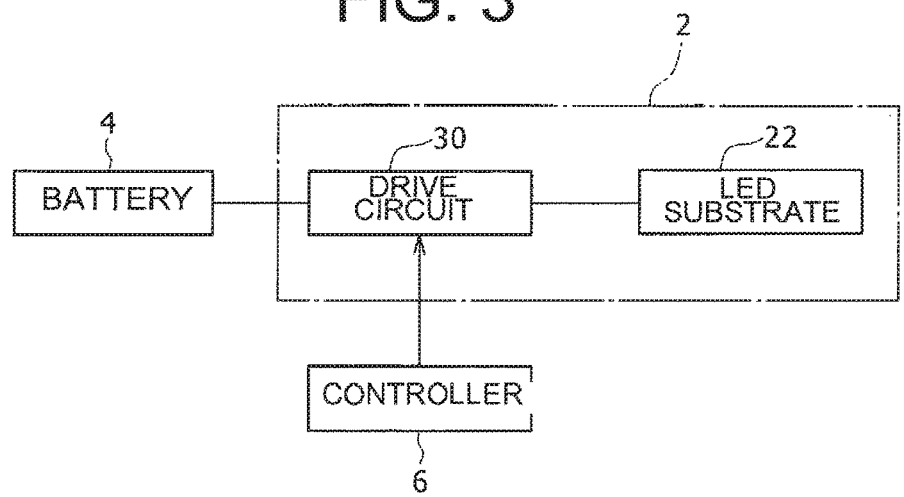
FIG. 4 is a functional block diagram including the headlight.

FIG. 4 is a functional block diagram including the headlight 2. As shown in FIG. 4, the headlight 2 comprises, in addition to the LED substrate 22, the drive circuit 30. The drive circuit 30 is mounted on a circuit board (not shown), and is placed outside of the casing 21 of the headlight 2.

The drive circuit 30 is electrically connected to the battery 4. The drive circuit 30 includes, for example, a plurality of switching units corresponding to each of the light sources 50 of the headlight 2. Switching ON and OFF of the switching units is controlled independently from each other based on a signal from the controller 6. Each switching unit is formed from, for example, a transistor or the like. A light source 50 corresponding to the switching unit which is controlled to be switched ON by the controller 6 is supplied with electric power from the battery 4, and is lighted. In this manner, electric power is individually supplied to each light source 50 by the drive circuit 30, and lighting or extinguishing is controlled thereby. In the present embodiment, when the light source 50 is lighted, all of the switching units are simultaneously controlled to be switched ON, and when the light source 50 is extinguished, all of the switching units are simultaneously controlled to be switched OFF.

The controller 6 is desirably formed, for example, by a microcomputer. The controller 6 comprises a CPU (Central Processing Unit), and a storage unit such as a RAM (Random Access Memory), and a ROM (Read Only Memory). The CPU has functions to read and execute a program or the like which is stored in the storage unit in advance. The RAM has a function to temporarily store the read program and process data. The ROM has a function to store in advance a control program, a predetermined threshold, or the like. The controller 6 can be realized by software executed by the microcomputer, but alternatively, a part of the controller 6 may be formed by hardware.

Figure 5A:
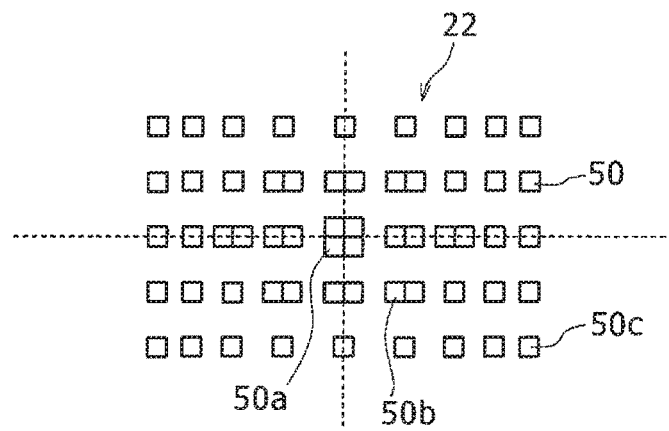
FIG. 5A is a diagram showing a relationship between a light emission surface of a light source substrate, a plurality of light incidence surfaces of a light guide, and a plurality of light exit surfaces of the light guide, and is a plan view showing the light emission surface of the light source substrate.
Figure 5B:
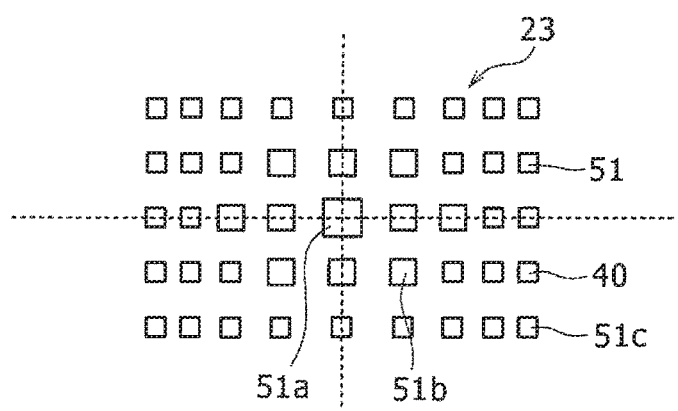
FIG. 5B is a diagram showing a relationship between a light emission surface of a light source substrate, a plurality of light incidence surfaces of a light guide, and a plurality of light exit surfaces of the light guide, and is a plan view showing the plurality of light incidence surfaces of the light guide.
Figure 5C:
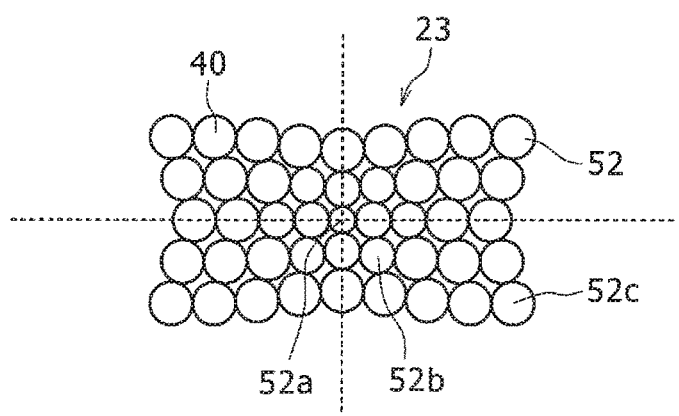
FIG. 5C is a diagram showing a relationship between a light emission surface of a light source substrate, a plurality of light incidence surfaces of a light guide, and a plurality of light exit surfaces of the light guide, and is a plan view showing the plurality of light exit surfaces of the light guide.

FIGS. 5A-5C are diagrams showing a relationship between the light emission surface of the LED substrate 22, a plurality of light incidence surfaces 51 of the primary lens 23, and a plurality of light exit surfaces 52 of the primary lens 23. FIG. 5A is a plan view showing the light emission surface of the LED substrate 22, FIG. 5B is a plan view showing the plurality of light incidence surface 51 of the primary lens 23, and FIG. 5C is a plan view showing the plurality of light exit surfaces 52 of the primary lens 23.

As shown in FIGS. 5A and 5B, in the plan view, the size (area) of the light emission surface of the light source 50 of the LED substrate 22, and the size (area) of the light incidence surface 51 of the light guide 40 corresponding to each light source 50 in the primary lens 23 are in a correspondence relationship. Specifically, the size (area) of the light incident surface 51a of the light guide 40 corresponding to the first group light source 50a having a light emission surface with the largest area in the plan view is the largest. In addition, the size (area) of the light incidence surface 51b of the light guide 40 corresponding to the second group light source 50b having a light emission surface with a medium area in the plan view is medium. Finally, the size (area) of the light incidence surface 51c of the light guide 40 corresponding to the single light source 50c having the light emission surface with the smallest area in the plan view is the smallest.

On the other hand, as shown in FIGS. 5B and 5C, in the plan view, the size (area) of the light incidence surface 51 of the light guide 40 of the primary lens 23 and the size (area) of the light exit surface 52 of the light guide 40 of the primary lens 23 are in an inverted correspondence relationship. Specifically, the size (area) of the light exit surface 52a of the light guide 40 having the light incidence surface 51a with the largest area in the plan view is the smallest. In addition, the size (area) of the light exit surface 52c of the light guide 40 having the light incidence surface 51c with the smallest area is the largest. The size (area) of the light exit surface 52b of the light guide 40 having the light incidence surface 51b with the medium area is medium. In the example configuration of FIG. 5C, the light exit surfaces 52a, 52b, and 52c have circular shapes in the plan view. Thus, a size (diameter) of the light exit surface 52a is smaller than the size (diameter) of the light exit surface 52b, and the size (diameter) of the light exit surface 52b is smaller than the size (diameter) of the light exit surface 52c.

As a result, the light emitted from the first group light source 50a having the highest luminosity is incident on a corresponding large light incidence surface 51a, and is focused so that a cut surface perpendicular to a direction of progress of light gradually becomes smaller as the light progresses in the light guide 40. The light having the highest luminosity, which is focused by the light guide 40, is emitted from the smallest light exit surface 52a.

The light from the second group light source 50b having medium luminosity, surrounding the first group light source 50a, is incident on a corresponding, medium size light incidence surface 51b, and is emitted from the corresponding light exit surface 52b of medium size. Further, the light from the single light source 50c placed at a periphery portion among the plurality of light sources 50 is incident on a corresponding smallest light incidence surface 51c, and is guided by the light guide 40 so that the density of the light is reduced as the light progresses. Then, the light is emitted from the largest light exit surface 52c.

As described, according to the present embodiment, the first group light source 50a which emits the light with the highest luminosity is placed at the center in the X direction and the Y direction on the LED substrate 22. In addition, the second group light source 50b which emits the light with luminosity with a magnitude next to the first group light source 50a is placed surrounding the first group light source 50a on the LED substrate 22, and the single light source 50c which emits the light with the lowest luminosity is placed at the periphery portion of the LED substrate 22. Further, the light exit surface 52a of the light guide 40 corresponding to the first group light source 50a is the smallest in the plan view, and the light exit surface 52b of the light guide 40 corresponding to the second group light source 50b is of medium size in the plan view. The light exit surface 52c of the light guide 40 corresponding to the single light source 50c is the largest in the plan view.

Figure 6:
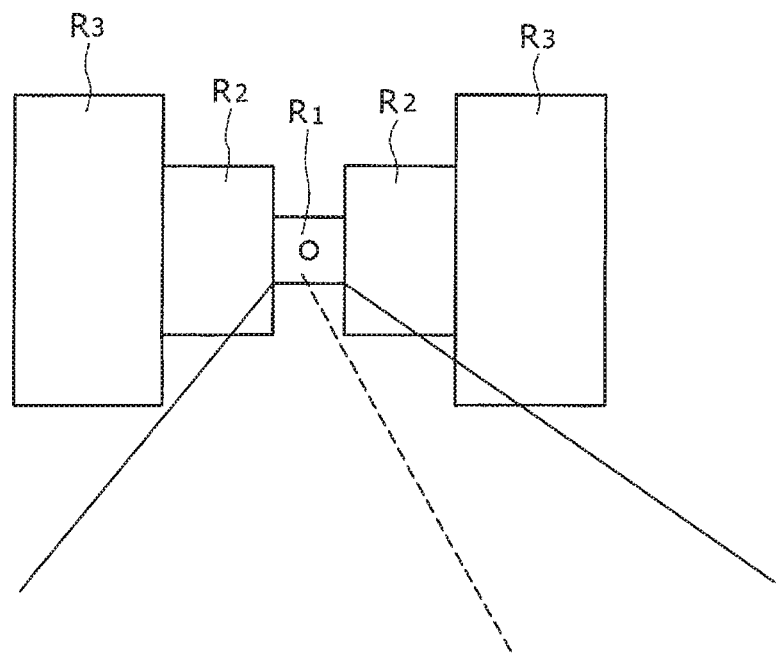
FIG. 6 is a diagram showing an illumination region when viewed from a driver seat of the automobile.

Therefore, as shown in FIG. 6 which shows an illumination region viewed from a driver seat, a central region R1 in which a farther region in an illuminable region is illuminated can be illuminated with the light from the first group light source 50a having the highest luminosity. Further, in the central region R1, the illumination region corresponding to each light source 50 can be set smaller compared to an R2 region adjacent to the region R1, resulting in a higher resolution. Therefore, even when the light from the LED substrate 22 is projected through the projector lens 24, it is possible to suppress occurrence of luminosity insufficiency in the central region R1 in which a farther region is illuminated within the illuminable region, and also suppress occurrence of the resolution insufficiency. Therefore, a driver of the automobile 1 can clearly view an oncoming vehicle or the like, and thus, accidents can be lessened and exhaustion of the driver can be suppressed.

Figure 7:
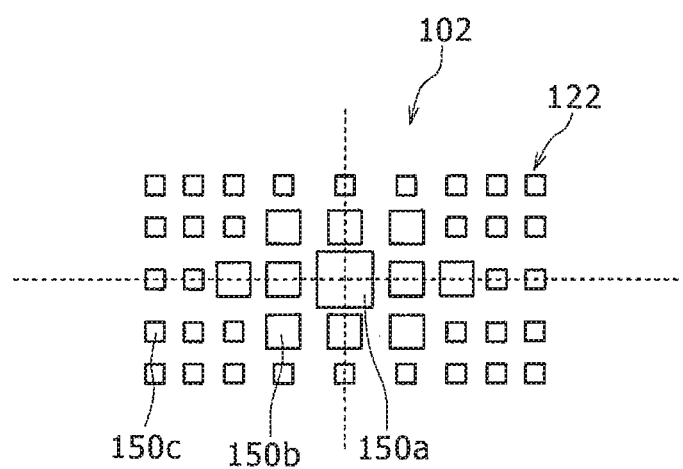
FIG. 7 is a plan view showing a light emission surface of a light source substrate, corresponding to FIG. 5A, in a headlight according to an alternative configuration.

In FIG. 6, the resolution of the adjacent region R2 which is adjacent to the central region R1 is higher than a resolution of a periphery region R3 positioned at a further periphery thereof. Further, in the embodiment described above, the light source 50 which emits the light with the highest luminosity for illuminating the central region R1 in which a farther region is illuminated in the illuminable region is formed with the first group light source 50a having a largest number of LED chips. However, alternatively, as shown in FIG. 7 which is a plan view showing a light emission surface of an LED substrate 122 of a headlight 102 of an alternative configuration and corresponding to FIG. 5A, a light source 150a having the highest luminosity positioned at the center of the LED substrate 122 may be formed with an LED chip having the largest size. Further, a light source 150b having a medium luminosity and placed surrounding the light source 150a with the highest luminosity may be formed from an LED chip having a medium size. Finally, a light source 150c having the lowest luminosity and placed at the periphery of the LED substrate 122 may be formed from an LED chip having the smallest size. In this manner, an illumination performance similar to that of the above-described embodiment may be realized.

Alternatively, all of the light sources placed on the LED substrate may be formed with the same LED chips, and the electric power supplied to each LED chip may be varied. Electric power of the largest quantity may be supplied to the LED chip placed at the center of the LED substrate, so that the luminosity of the light emitted from the LED chip placed at the center is the highest. Further, electric power of medium quantity may be supplied to a plurality of LED chips surrounding the LED chip placed at the center, and electric power of the smallest quantity may be supplied to the LED chips placed at the periphery of the LED substrate. In this manner, an illumination performance may be realized which is similar to that of the headlight 2 of the above-described embodiment or that of the headlight 102 of the alternative configuration shown in FIG. 7.

Figure 8:
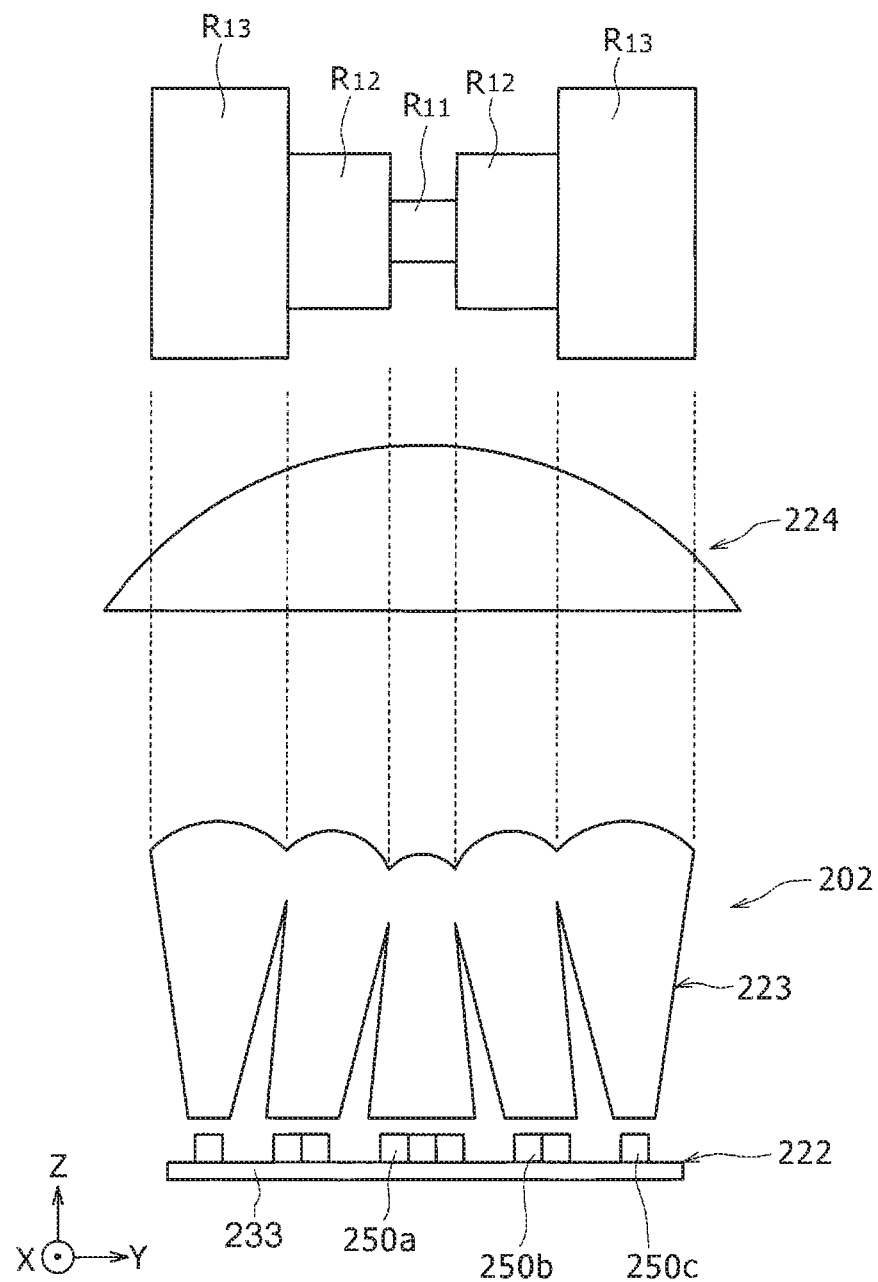
FIG. 8 is a diagram showing a relationship between a light source substrate, a light guide, a projector lens, and an illumination region viewed from a driver seat, in an automobile which uses a headlight according to the alternative configuration.

FIG. 8 is a diagram showing a relationship between an LED substrate 222, a primary lens 223, a projector lens 224, and an illumination region viewed from the driver seat, in an automobile which uses a headlight 202 of an alternative configuration. In FIG. 8, the LED substrate 222 is shown in a cross-sectional diagram in which a substrate of the LED substrate 222 is vertically divided into two at a cut surface including the Y direction and the Z direction. In this alternative configuration, a first group light source 250a formed from 9 LED chips placed in 3 rows and 3 columns is placed at the center, and a second group light source 250b adjacent to the first group light source 250a in the Y direction is formed from 4 LED chips placed in 2 rows and 2 columns. Further, at an end in the Y direction, a single light source 250c formed from 1 LED chip is placed. In the present alternative configuration, a central region R11 in which a farther region is illuminated in the illuminable region can be illuminated with the first group light source 250a having a higher luminosity than an adjacent region R12 and a peripheral region R13, and can be illuminated with a higher emphasis.

As in the present alternative configuration, the luminosity of light emitted from each light source may be suitably adjusted according to the specification. For example, when the automobile is automatically driven, a human does not need to drive. In such cases, there may be cases where it is desired to analyze the peripheral region in more detail than the center of the illumination region. In such a case, the plurality of light sources may be placed in a plurality of columns, with each column including two or more light sources. The size of the light exit surfaces of the plurality of light guides in the plan view may then be set in a manner to be stepwise reduced from the light guide positioned at the center in an orthogonal direction orthogonal to both an extension direction of the column and the thickness direction of the substrate toward the light guide positioned at the end of the orthogonal direction, along the orthogonal direction. In this manner, the resolution of the peripheral region may be set higher than the resolution of the central region of the illumination region. In the headlight of the present disclosure, it is sufficient that the size, in the plan view, of the light exit surface of the light guide corresponding to the light source which illuminates the central region in the illuminable region differs from the size, in the plan view, of the light exit surface of the light guide corresponding to the light source which illuminates the peripheral region in the illuminable region.

Further, in the headlight of the present disclosure, a desired illumination region can be realized by suitably adjusting placement and size of the light exit surface of each light guide of the primary lens, and further, a desired resolution at each local region in the illumination region can be realized. Next, with reference to FIGS. 9A and 9B, the reasons why the desired illumination region can be realized and the desired resolution can be realized at each local region in the illumination region will be explained.

Figure 9A:
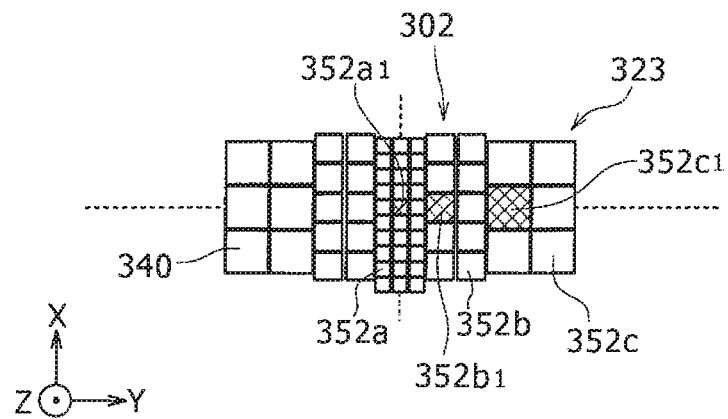
FIG. 9A is a schematic diagram showing a placement and a size of a light exit surface of each light guide in a light guide according to another alternative configuration.
Figure 9B:
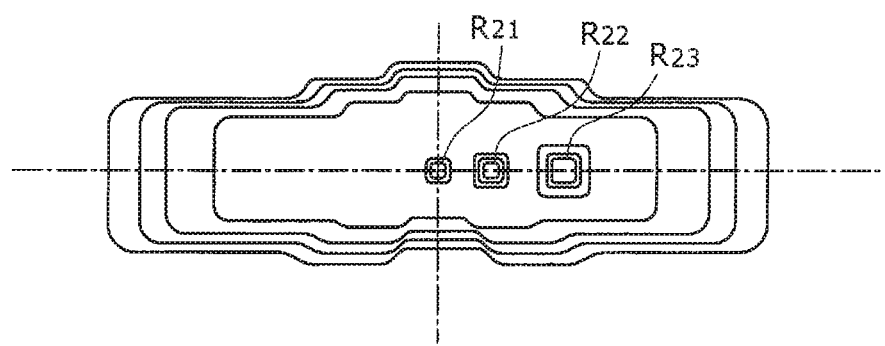
FIG. 9B is a luminosity distribution diagram when an illumination region of an automobile having a headlight using the light guide of FIG. 9A is viewed from a driver seat, and shows an equi-luminosity curve.

FIG. 9A is a schematic diagram showing placements and sizes of light exit surfaces 352a, 352b, and 352c of light guides 340 in a primary lens 323 of another alternative configuration, and is a plan view viewing the primary lens 323 from the light exit side. FIG. 9B is a luminosity distribution diagram when the illumination region of the automobile having a headlight 302 which uses the primary lens 323 is viewed from the driver seat, and is a diagram showing an equi-luminosity curve.

In this alternative configuration, the same light source corresponds to each light guide 340, and light of the same luminosity is incident on each light guide 340. In addition, in the luminosity distribution diagram of FIG. 9B, a region shown by R21 shows a region illuminated by light emitted from a light exit surface 352a1 in FIG. 9A, and a region shown by R22 shows a region illuminated by light emitted from a light exit surface 352b1. A region shown by R23 is a region illuminated by light emitted from a light exit surface 352c1.

As shown in FIG. 9A, the light exit surfaces 352a, 352b, and 352c of the light guides 340 are set such that the size in the plan view is stepwise increased in 3 steps from the center toward the left and right in a left-and-right direction (Y direction) on the page.

As a result, the region R21 which is placed at the center of FIG. 9B can be formed in the smallest size, the region R22 adjacent to the region R21 can be set in the medium size, and the region R23 positioned at the end in the Y direction can be set in the largest size. Therefore, the resolution of the region R21 placed at the center of FIG. 9B can be set high, and a luminosity distribution can be realized in which the resolution is stepwise reduced from the center portion toward the end portion along the Y direction. In addition, the light exit surfaces 352a, 352b, and 352c of the light guides 340 are placed so that the up-and-down direction (X direction) on the page is asymmetrical at the central portion in the Y direction, and a larger number of light exit surfaces 352a are placed at a lower side of the page than an upper side. More generally speaking, there exists a plan which includes the extension direction of the column (X direction) and the thickness direction of the substrate (Z direction), and which makes all of a plurality of light exit surfaces of the light guide (all light exit surfaces) symmetric in plane. However, there is no plane which includes the orthogonal direction (Y direction) and the thickness direction of the substrate (Z direction) and which makes all of the plurality of light exit surfaces symmetric in plane.

The light emitted from the primary lens 323 passes through the projector lens and is then emitted with the left and right inverted and up and down inverted. Therefore, in the present alternative configuration, as shown in FIG. 9B, the luminosity of the light in the central region viewed from the driver seat can be set to be higher at the upper side than the lower side, and a deformed luminosity distribution having the up-and-down direction asymmetric can be realized. In this manner, by suitably adjusting the placement and size of the light exit surfaces of the light guides in the primary lens, it becomes possible to realize a desired illumination region (luminosity distribution) and a desired resolution at each local region in the illumination region.

As is clear from the above description, each of the headlights (illumination devices) 2, 102, 202, and 302 of the present disclosure comprises the LED substrate (light source substrate) 22 in which a plurality of the light sources 50 are mounted on the substrate 33, and the primary lens (light guide) 23 placed at a light emission side of the plurality of light sources 50. Further, the primary lens 23 includes a plurality of light guides 40 corresponding in the one-to-one relationship to the plurality of light sources 50. Each light guide 40 includes the light incidence surface 51 placed at the light emission side of the light source 50, and a light exit surface 52 placed at an end opposite from the light incidence surface 51, and guides the light from the corresponding light source 50. The light sources 50a, 150a, and 250a illuminate central regions R1 and R11 at a center side of the illuminable region of the headlights 2, 102, 202, and 302. The light sources 50c, 150c, and 250c illuminate the peripheral regions R3 and R13 surrounding the central regions R1 and R11 of the headlights 2, 102, 202, and 302. The sizes of the light exit surfaces 52a and 352a of the light guides 40 corresponding to the light sources 50a, 150a, and 250a differ respectively from the sizes of the light exit surfaces 52c and 352c of the light guides 40 corresponding to the light sources 50c, 150c, and 250c.

That is to say, each of the headlights (illumination devices) 2, 102, 202, and 302 of the present disclosure comprises the substrate 33, 233 on which a plurality of the light sources 50 are mounted, and the primary lens (light guide) 23 provided at a light emission side of the plurality of light sources 50. The primary lens 23 includes a plurality of light guides 40 corresponding to the plurality of light sources 50. Each of the plurality of light guides 40 includes a light incidence surface 51 provided at the light emission side of the light source, and a light exit surface 52 provided at an opposite end of the primary lens 23, and guides light from a corresponding light source 50. A size of a central region of the light exit surface 52a, 352a of the primary lens 23 differs from a size of a peripheral region of the light exit surface 52c, 352c of the primary lens 23. Therefore, the resolution of the region illuminated by the light emitted from a location of the light exit surface 52, having a small size, of the light guide 40 corresponding to the light source 50 can be set high, and the resolution in the central regions R1 and R11 or the peripheral region in the illuminable region can be set high. Further, by causing the light with higher luminosity to be incident on the light exit surface 52 having a smaller size in the plan view, it is possible to set a high luminosity in the central regions R1 and R11 or in the peripheral region.

Alternatively, the plurality of light sources 50 may be placed in a plurality of columns, with each column having two or more light sources. Further, the size of the light exit surfaces 52 of the plurality of light guides 40 may be set to be stepwise increased or reduced from the light guide 40 positioned at the center in the orthogonal direction orthogonal to both the direction of extension of the column and the thickness direction of the substrate 33 along the orthogonal direction toward the light guide 40 positioned at the end in the orthogonal direction.

That is to say, the plurality of light sources 50 may be placed in a plurality of columns, each column including two or more light sources. The sizes of the light exit surfaces 52 of the plurality of light guides 40 may be stepwise increased or reduced from the center region of the primary lens 23 toward the peripheral region of the primary lens 23.

According to this configuration, a luminosity distribution can be realized where the resolution is stepwise increased or reduced from the center in the orthogonal direction toward the ends. Therefore, for example, when the illumination device is the headlight 2, 102, 202, or 302, a luminosity distribution can be realized in which there is no uneasy feeling when viewed from the driver seat.

Alternatively, the sizes of the light exit surfaces 52 of the plurality of light guides 40 may be set to be stepwise increased from the light guide 40 positioned at the center toward the light guide 40 positioned at the ends. The luminosity of the light emitted from the light source 50 may be set to be stepwise reduced from the light source 50 positioned at the center in the orthogonal direction along the orthogonal direction toward the light sources 50 positioned at the ends in the orthogonal direction.

That is to say, the sizes of the light exit surfaces 52 of the plurality of light guides 40 may be stepwise increased from the central region of the primary lens 23 toward the peripheral region of the primary lens 23. Luminosity of light emitted from the plurality of light sources 50 mar be stepwise reduced from a central region of the plurality of light sources 50 toward a peripheral region of the plurality of light sources 50. According to such a configuration, even when the light from the LED substrate 22 formed from the plurality of light sources 50 is projected through the projection lens 24 or 224, occurrence of luminosity insufficiency and occurrence of resolution insufficiency can be reduced also in the central regions R1 and R11 in the illuminable region. Further, by suitably arranging the plurality of light sources 50 and suitably adjusting the shape and placement of the light exit surfaces 52 of the plurality of light guides 40, it becomes possible to realize superior luminosity and superior resolution in the central regions R1 and R11 in the illuminable region.

Alternatively, the plurality of light sources 50 may include three or more group light sources 50a and 50b including a plurality of LED chips (light emitting elements). In addition, the group light source 50a having the largest number of LED chips may be placed at the center in the orthogonal direction. The number of the LED chips included in the group light sources 50a and 50b may be stepwise reduced from the center in the orthogonal direction toward the ends.

That is to say, the plurality of light sources 50 may include three or more group light sources 50a, 50b including a plurality of LED chips. A number of LED chips in a group light source 50a provided in the central region of the plurality of light sources 50 may be larger than a number of LED chips in any other of the three or more group light sources 50a, 50b. The number of LED chips included in the three or more group light sources 50a, 50b may be stepwise reduced from the central region toward the peripheral region of the plurality of light sources 50.

According to such a configuration, a luminosity distribution in which occurrence of the luminosity insufficiency and occurrence of resolution insufficiency in the central regions R1 and R11 in the illuminable region are reduced can be realized with a simple structure.

Alternatively, the light sources 150a, 150b, and 150c corresponding to the light guides may include only one LED chip, an LED chip having the largest size may be placed at the center in the orthogonal direction, and the size of the LED chip may be stepwise reduced from the center in the orthogonal direction toward the ends.

That is to say, each of the light sources 150a, 150b, and 150c corresponding to each light guide may include a LED chip. A size of the LED chip in the central region of the plurality of light sources may be larger than a size of the LED chip in the peripheral region of the plurality of light sources. The size of each LED chip may be stepwise reduced from the central region toward the peripheral region of the plurality of light sources.

According to such a configuration, a luminosity distribution in which the occurrence of luminosity insufficiency and the occurrence of resolution insufficiency in the central regions R1 and R11 in the illuminable region are reduced can be realized with a simple structure.

A headlight according to the present disclosure may include the illumination device of the present disclosure, and the projector lens 24 or 224 placed at an opposite side from the side of the light source 50 of the primary lens 23 or 223 in the illumination device.

That is to say, a headlight according to the present disclosure may include the illumination device of the present disclosure, and the projector lens 24 or 224 placed at a side of the primary lens 23. or 223 in the illumination device. The primary lens 23. or 223 may be positioned between the projector lens 24 or 224 and the light source 50.

According to such a configuration, the luminosity in the central regions R1 and R11 or in the peripheral region in the illuminable region can be set high and the resolution can also be set high.

The automobile (movable body) 1 according to the present disclosure may comprise the headlight 2, 102, 202, or 302 according to the present disclosure.

According to such a configuration, the luminosity in the central regions R1 and R11 or the peripheral region in the illuminable region can be set high, and the resolution can be set high.

A light source module of the present disclosure is not limited to those of the above-described embodiment and alternative configurations, and various modifications and improvements are possible within the scope of the claims of the present application and the equivalences thereof.

For example, in the above-described embodiment, a configuration is described in which the projector lens 24 is a convex lens having the convex shape at the light emission side. Alternatively, the projector lens may be a concave lens or the like having the concave shape at the light emission side, or may alternatively be any lens which can project the incident light. With reference to FIG. 2, the light exit surface 52 of the light guide 40 of the primary lens 23 has a convex shape on the light exit side, but alternatively, the light exit surface of the light guide of the primary lens may have a convex shape in the light exit side, or an approximate planar shape. In addition, a configuration is described in which the movable body is an automobile. However, it is sufficient that the movable body is a means of transport, and may be, for example, a vehicle other than an automobile, a ship, an airplane, or the like. Further, a case is described in which the illumination device is the headlight 2, 102, 202, or 302, but alternatively, the illumination device may be equipped on facilities and machines other than the means of transport.

The invention claimed is:
1. An illumination device comprising:
 a substrate on which a plurality of light sources is mounted; and
 a primary lens provided at a light emission side of the plurality of light sources, wherein
 the primary lens includes a plurality of light guides corresponding to the plurality of light sources,
 each of the plurality of light guides includes a light incidence surface provided at the light emission side of the light source, and a light exit surface provided at an opposite end of the primary lens, and guides light from a corresponding light source, and
 in a plan view viewed from a direction of normal of the substrate, a size of an area of the light exit surface of a light guide among the light guides that is located in a central region of the primary lens differs from a size of an area of the light exit surface of each light guide that is located in a peripheral region of the primary lens.
2. A headlight comprising:
 the illumination device according to claim 1; and a projector lens placed at a side of the primary lens in the illumination device such that the primary lens is positioned between the projector lens and the light source.

3. A movable body comprising the headlight according to claim 2.

4. An illumination device comprising:
a substrate on which a plurality of light sources is mounted; and
a primary lens provided at a light emission side of the plurality of light sources, wherein
the primary lens includes a plurality of light guides corresponding to the plurality of light sources,
each of the plurality of light guides includes a light incidence surface provided at the light emission side of the light source, and a light exit surface provided at an opposite end of the primary lens, and guides light from a corresponding light source,
a size of the light exit surface of a light guide among the plurality of light guides that is located in a central region of the primary lens differs from a size of the light exit surface of each light guide that is located in a peripheral region of the primary lens,
the plurality of light sources is placed in a plurality of columns, each column including two or more light sources, and
the sizes of the light exit surfaces of the plurality of light guides are stepwise increased or reduced from the center region of the light guide toward the peripheral region of the light guide.

5. The illumination device according to claim 4, wherein
the sizes of the light exit surfaces of the plurality of light guides are stepwise increased from the central region of the primary lens toward the peripheral region of the primary lens, and
luminosity of light emitted from the plurality of light sources is stepwise reduced from a central region of the plurality of light sources toward a peripheral region of the plurality of light sources.

6. The illumination device according to claim 5, wherein
the plurality of light sources includes three or more group light sources including a plurality of light emitting elements,
a number of the light emitting elements in a group light source provided in the central region of the plurality of light sources is larger than a number of the light emitting elements in any other of the three or more group light sources, and the number of light emitting elements included in the three or more group light sources is stepwise reduced from the central region toward the peripheral region of the plurality of light sources.

7. The illumination device according to claim 5, wherein
each of the light sources corresponding to each light guide includes a light emitting element,
a size of the light emitting element in the central region of the plurality of light sources is larger than a size of the light emitting element in the peripheral region of the plurality of light sources, and
the size of each light emitting element is stepwise reduced from the central region toward the peripheral region of the plurality of light sources.

8. The illumination device according to claim 4, wherein
the plurality of the light exit surfaces have reflection symmetry with respect to a direction of extension of the column, and asymmetry with respect to a direction orthogonal to the direction of extension of the column.

9. A headlight comprising:
the illumination device according to claim 4; and
a projector lens placed at a side of the primary lens in the illumination device such that the primary lens is positioned between the projector lens and the light source.

10. A movable body comprising the headlight according to claim 9.

11. An illumination device comprising:
a substrate on which a plurality of light sources are mounted; and
a primary lens provided at a light emission side of the plurality of light sources, wherein
the primary lens includes a plurality of light guides corresponding to the plurality of light sources,
each of the plurality of light guides includes a light incidence surface provided at the light emission side of the light source, and a light exit surface provided at an opposite end of the primary lens, and guides light from a corresponding light source,
a size of the light exit surface of a light guide among the plurality of light guides that is located in a central region of the primary lens differs from a size of the light exit surface of each light guide that is located in a peripheral region of the primary lens, and
the size of the light exit surface becomes smaller as a luminosity energy of the light incident on the light incidence surface of the light guide having the light exit surface becomes larger.

* * * * *